Jan. 11, 1927.  
W. E. DUNSTON  
BUMPER  
Filed Oct. 31, 1921  
1,613,695
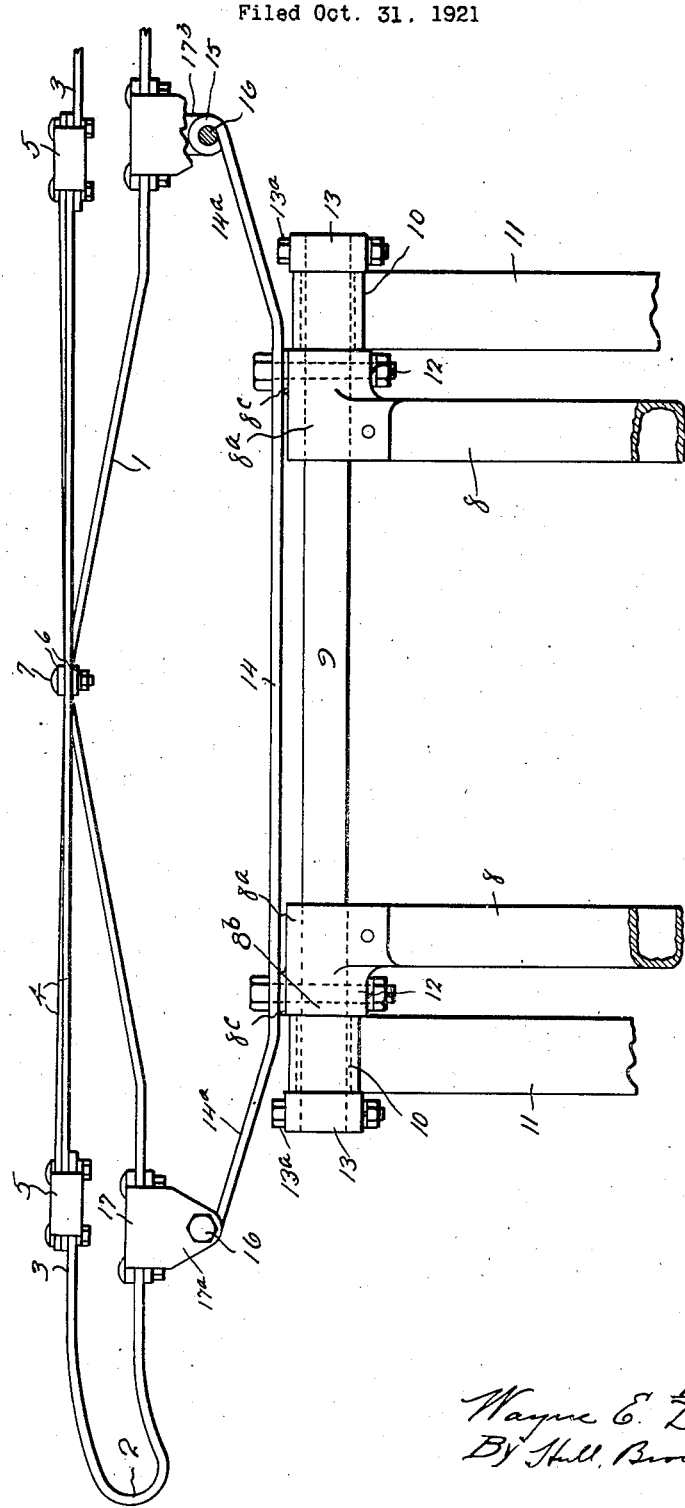

Patented Jan. 11, 1927.

1,613,695

UNITED STATES PATENT OFFICE.

WAYNE E. DUNSTON, OF KALAMAZOO, MICHIGAN, ASSIGNOR TO THE C. G. SPRING & BUMPER COMPANY, OF DETROIT, MICHIGAN, A CORPORATION OF DELAWARE.

BUMPER.

Application filed October 31, 1921. Serial No. 511,745.

This invention relates to bumpers such as are employed with automobiles, and has for its general object to provide a means for supporting such bumpers which will enable them to be applied to certain types of automobiles in a convenient and economical manner and which will be capable of cooperating with such bumpers to increase the efficiency thereof. The foregoing objects are accomplished in and through the construction shown in the drawing forming a part hereof, wherein the figure shows a plan view of the ends of the side members of an automobile having the invention applied thereto, a part of the bumper being broken away.

The bumper shown herein comprises a rear bar 1, preferably of the flat spring-plate type, having its ends bent into U-shape to provide rearwardly and laterally extending loops 2, the front ends being separated. The space between these end portions 3 is bridged by a pair of front plates 4, cooperating with the end portions 3 to form an impact section for the bumper. The ends of the plates 4 are connected to the corresponding plate—or bar—ends 3 by means of suitable clamping devices, indicated generally at 5. The plates 4 are preferably spaced apart vertically intermediate their ends, and the rear bar 1 is projected forwardly between such spaced portions and connected to the central portions thereof by means of plates 6 and one or more bolts 7, the construction in this respect resembling generally that shown in the McGregor Patent No. 1,372,154 issued March 22, 1921. Because of the fact that the detailed construction of the front of the bumper has no special relevance to the invention involved herein, further illustration and a specific description of such front portion will be unnecessary. However, in order to mount a bumper of this general type upon the ends of the side members of an automobile without the necessity for expensive and complicated connecting devices, the following construction is provided:—8 denotes the side members of an automobile, such as used upon the present Nash four-cylinder car, each side member having its end fitted with an end casting 8ª constituting an extension, each casting having a lateral projection 8ᵇ, the front (or rear) end of each casting having a bore extending transversely therethrough. Extending through the eyes is a transverse frame member 9, which may be tubular in form and which extends beyond the side frames to provide a support for the eyes 10 of the springs 11. The cross member 9 is shown as anchored in place by means of bolts 12 extending through the frame end castings and through said tube, while the ends of the cross tube are extended beyond the eyes 10 for the springs and are provided with collars 13 secured to the ends of the cross tube by bolts 13ª and retaining the springs in place. Each end member or casting is provided with a boss 8ᶜ which is adapted to form a seat for a cross bar 14, which bar is preferably formed from a plate of the same general character as that employed in making springs and spring bumpers. This plate is convenienty secured to the frame ends by means of the bolts 12 which secure the cross tube 9 in place. The outer ends of the bar or plate 14 are bent forwardly, or away from the frame members as shown at 14ª, providing resilient attaching arms, each of said arms being provided with an eye 15 adapted to receive a bolt 16 extending between and connected to the top and bottom plates 17ª and 17ᵇ of an attachment bracket 17 which is secured to the cooperating portion of the rear bar 1 of the bumper. This attaching bracket is preferably of the construction shown in my Patent 1,453,866, granted May 1, 1923.

By the construction shown and described herein, a bumper may be very conveniently and economically supported upon the end of an automobile frame of the type shown herein and in a manner which will enhance the efficiency of the bumper. A blow received by any part of the impact section of a bumper such as shown herein will not only be transmitted to and absorbed by the entire bumper (due to the particular construction and the pivotal mounting of the bumper) will also be yieldingly absorbed by means of the spring arms 14ª, the said arms thus constituting in effect operative parts of the bumper.

Having thus described my invention, what I claim is:

1. The combination, with the side members of a vehicle each having a laterally extended end and a cross member mounted in such ends, of a bumper-supporting member having a transversely extending portion connected to the said ends and to the cross member and having end portions extending outwardly and away from such connecting means, and a bumper pivotally connected to the last mentioned end portions.

2. The combination, with a pair of side frame members each having a transverse bore at its end and a transversely extending member mounted in such bores, of a bumper-supporting member extending transversely of the side frame members, means connecting both transversely extending members to the ends of the side frame members, forwardly extending resilient arms carried by the bumper-supporting member, and a bumper pivotally connected to said arms.

3. The combination, with the side frame members of a vehicle, of a continuous bumper supporting member extending across the ends of the said members and connected thereto, and having resilient arms projecting outwardly and away from the first mentioned members, a bumper comprising an impact section and an auxiliary section connected at its ends to the ends of the impact section, and means pivotally connecting the auxiliary section to the said arms.

4. The combination, with a bumper consisting of an impact section and an auxiliary section connected at its ends and intermediate its ends to the impact section, of a supporting member consisting of a continuous resilient bar attached intermediate its ends to the vehicle frame and projecting beyond the side members of said frame for connection to said auxiliary section of the bumper.

5. The combination, with a bumper consisting of an impact section and an auxiliary section connected at its ends and intermediate its ends to the impact section, of a supporting member consisting of a continuous resilient bar with an eye at each end attached intermediate its ends to the vehicle frame and projecting beyond the side members of said frame for pivotal connection to the auxiliary section of said bumper.

In testimony whereof, I hereunto affix my signature.

WAYNE E. DUNSTON.